(No Model.) 2 Sheets—Sheet 2.
J. C. HART.
CORN PLANTER.
No. 410,890. Patented Sept. 10, 1889.
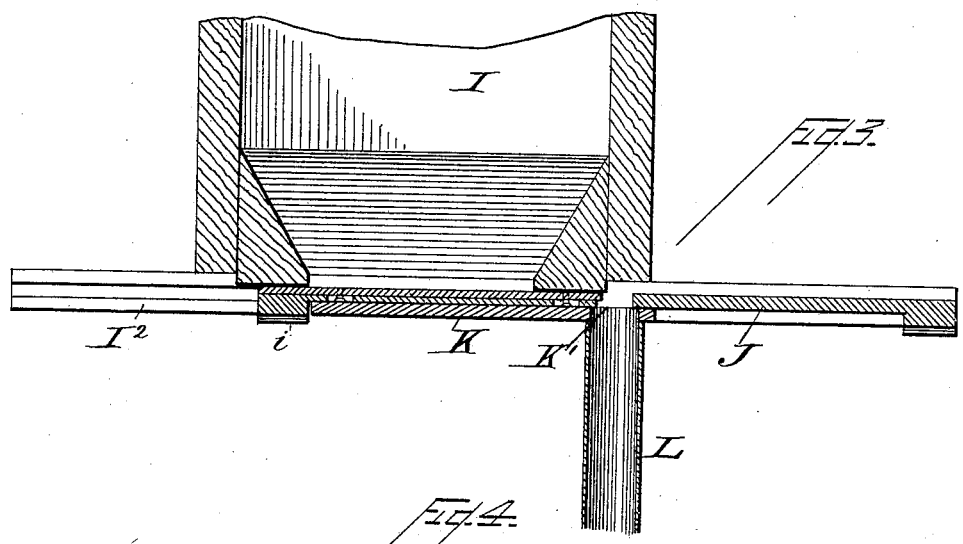
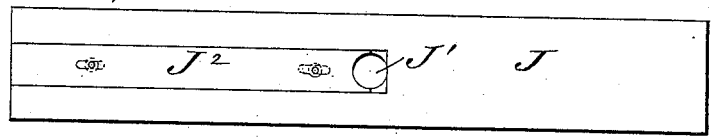
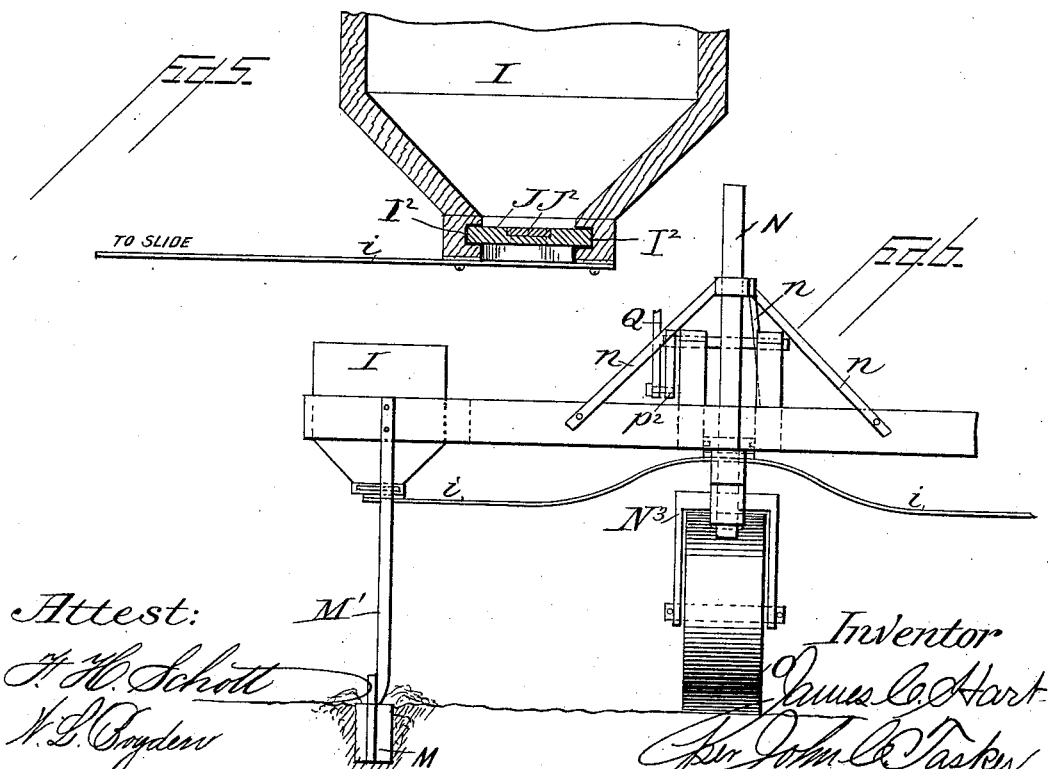
Attest:
F. H. Schott
W. S. Bryden
Inventor
James C. Hart
per John C. Tasker
Atty

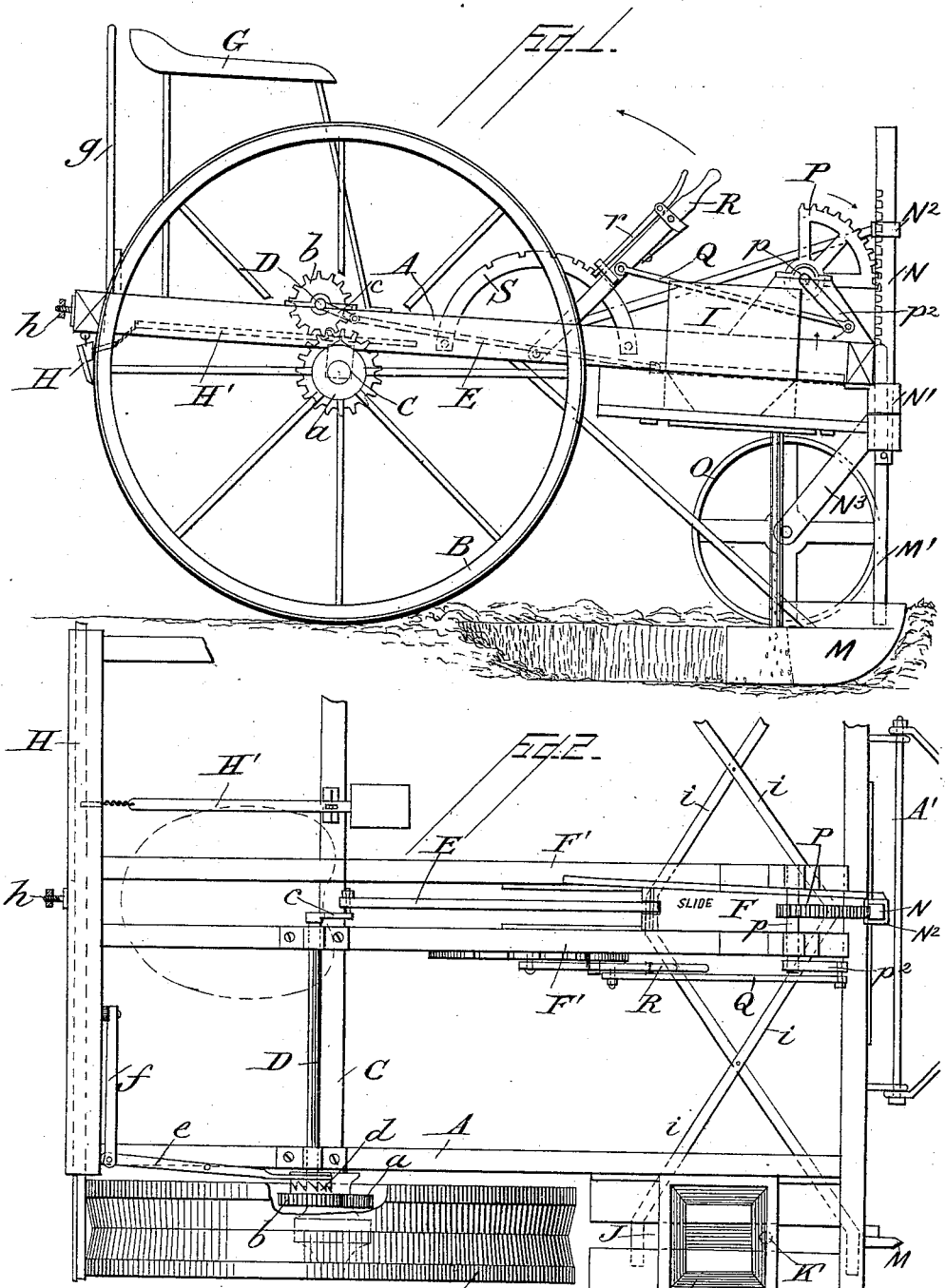

UNITED STATES PATENT OFFICE.

JAMES C. HART, OF BATH-ON-THE-HUDSON, NEW YORK.

CORN-PLANTER.

SPECIFICATION forming part of Letters Patent No. 410,890, dated September 10, 1889.

Application filed March 28, 1889. Serial No. 305,142. (No model.)

*To all whom it may concern:*

Be it known that I, JAMES C. HART, a citizen of the United States, residing at Bath-on-the-Hudson, in the county of Rensselaer and State of New York, have invented certain new and useful Improvements in Corn-Planters; and I do hereby declare the following to be a full, clear, and exact description of the invention, such as will enable others skilled in the art to which it appertains to make and use the same.

This invention relates to an improvement in corn-planters, the object thereof being to perfect and simplify and cheapen the construction of mechanism of this class, so as to adapt it for better and more general use; and the invention consists in the construction, arrangement, and combination of the several parts of the invention, substantially as will be hereinafter more specifically described, and then fully pointed out in the annexed clauses of claim.

In the accompanying drawings, illustrating my invention, Figure 1 is a side elevation of my improved corn-planter. Fig. 2 is a partial top plan view of the same. Fig. 3 is an enlarged longitudinal section of one of the corn or seed boxes. Fig. 4 is a detail plan view of the slide in the bottom of said seed-box. Fig. 5 is an enlarged cross-section of the corn or seed box which measures and delivers the seed into the spout, and Fig. 6 is a partial front elevation of my improved corn-planter.

Similar letters of reference designate corresponding parts throughout all the different figures of the drawings.

A denotes in general the frame-work in connection with which the several mechanical parts which make up my improved corn-planter are arranged. I am confined to no particular construction for this frame A, but claim the liberty of fashioning it in the manner that will best adapt it for its purpose. This frame A has the cross-axle C, on the ends of which are the driving-wheels B B. The frame A is furthermore provided with a suitable driver's seat G, arranged in the rear part thereof, and also with the thills, shafts, or other draft mechanism A′, whereby the machine may be drawn by a horse or other animal.

Near the driver's seat, to the right and a little in the rear thereof, is a lever-handle *g*, which I term the "clutch-lever." It operates a link *f*, which is pivoted to the lever *e*, fulcrumed on the frame A and having its end connecting with the clutch *d* on the horizontal shaft D, suitably journaled in the main frame of the machine. The driver by laying hold of the clutch-lever *g* can operate this clutch so as to connect or disconnect the shaft D and the wheel B, so that the rotation of said wheel B may rotate likewise the shaft D. On this shaft D is a gear *b*, that meshes with a gear *a*, located on the axle C and secured to the wheel B. The clutch *d* is of the usual construction, having one toothed part integral with the gear *b* and having another toothed part feathered on the shaft D and sliding thereon under the actuation of the lever *e*. When the toothed parts of the clutch are in engagement, it is obvious that motion will be transmitted from the wheel B to the shaft D; but when they are disengaged the loose gear *b* will revolve idly upon the shaft D and the latter will not revolve.

On the inner end of the shaft D is a crank *c*, which connects by means of a link or connecting-rod E with a horizontal sliding plate F, which moves in ways F′ F′, placed centrally in the machine and suitably supported in the main frame-work. This center slide F connects by suitable horizontal cross-braces *i i* with slides J J, which operate in connection with the bottom of the seed or corn hoppers I I. These seed or corn hoppers I I are located one at each side of the machine, directly in advance of the driving-wheels B B. They are preferably constructed so as to have a sloping interior, that converges toward the bottom. These boxes are of any suitable size and dimensions, and are adapted to contain the seed-corn which it is the function of the machine to plant.

The seed boxes or hoppers I I are each provided with a suitable bottom K, which has therein an opening K′, which is preferably circular or oval, but which may be of any desired shape and size. This opening is so located that the corn, grain, or other seed may be discharged from the hopper through it.

Connected to the bottom K at the point where the opening K' is situated is a vertical discharge-pipe L, which extends downward to the shoe, runner, or furrow-opener M, carried by the vertical post or frame M', which is rigidly secured at its upper end to the front of the frame of the machine. (See Figs. 1 and 6.)

The seed-hoppers I I, in addition to being provided with the apertured bottoms, are also furnished with suitable horizontal ways or grooved bars I² I², adapted to receive between them the slide J, which is thus situated so as to be capable of a horizontal sliding movement. Said slide J is located above the bottom K and between it and the interior of the hopper. The slide J is furnished with an opening which is circular, oval, or other desirable shape J', so located and arranged that when the slide J during its reciprocations comes into the proper position the opening J' may register with the opening K'. Thus during the movements of the machine it will be seen that the entire bottom of the hopper is normally kept closed except at the instant when the slide J during its movement brings its aperture J' into coincidence with the opening K' in the bottom K, and thus permits an outflow for the instant of the seed contained within the slide-opening J'. The opening J' in the slide J may vary in size owing to my improved construction of the slide, which has a supplemental slide J² arranged therein, as shown in Fig. 4, and held in place by suitable set-screws, which when loosened permit the adjustment of the supplemental slide J², so as to make larger or smaller the opening J', said opening in the main slide being properly cut to permit such a result, and the supplemental slide J² is adjusted, as has been just explained.

It having been already explained that the center slide F is rigidly connected by cross-braces i i with the hopper-slides J J, it will be evident, without need of further additional description, that when the shaft D is so clutched with the wheel B as to permit it to revolve this motion will, through the medium of the crank c and the connecting-rod E, constantly reciprocate the center slide F, and this will cause the hopper-slides J J to be likewise constantly reciprocated, and the result will be that at each reciprocation a certain amount of seed will be discharged from the hoppers I I and cast into the furrow through the furrow-opener M. This furrow-opener M is rearwardly provided with a vertical slot, through which the seed is dropped into the furrow. It may be proper to state that the shoes or runners M M move substantially in front of the wheels B B.

In the rear of the machine is a scraper H, which is so hinged to the frame as to be in proper position with relation to the wheels B B upon which it acts. It is operated by means of a foot-lever H', fulcrumed on one of the cross-bars of the main frame and loosely connected at its rear end with a rigid pin on the scraper-bar.

There is a central pin h on the rear bar of frame for the attachment thereto of a marker when desired.

One of the main features of my improved corn-planter is the mechanism whereby I am enabled to locate the forward portion of the machine at the proper level to accomplish the best results; for it will be evident at a glance that it will be necessary, in order to have the best work, to have some means for raising or lowering the furrow-openers to bring them into proper proximity to their work. This mechanism is as follows: N denotes a vertical rack-bar. It is preferably square in cross-section, and it has two bearings, one of which is the box N', secured on the front of the frame-work, and the other the box N², located vertically above the same and carried by the diagonal supports n n. This rack-bar is thus movable endwise in a vertical direction. It carries at its lower end a frame N³, in which a wheel O is journaled. Said frame N³ projects backward under the main frame of the machine to a certain degree, thus occupying the oblique position indicated in Fig. 1, which position enables the wheel O to be located beneath the frame. The rack-bar N is engaged by a segment-gear P, whose shaft p is journaled in suitable bearings located upon the horizontal ways F' F', between which the center slide F reciprocates. The shaft p has at one end a crank p², pivoted to a connecting rod or link Q, which in turn is pivoted to a lever-handle R, which is provided with a supplemental catch-lever r, the end of which engages indentations in the sector S. The lever-handle R is within easy reach of the driver or operator of the machine. By laying hold of this lever and moving it in the direction shown by the arrow in Fig. 1, the segment P will be rotated in the direction shown by the arrow in Fig. 1 and thus the rack-bar depressed. A reverse movement of the lever-handle R will lift the rack-bar. When said lever-handle has been moved into any predetermined position, it can be firmly held in that position by the catch-lever r.

It will thus be seen that by this arrangement the segment, crank, connecting-rod, and lever just described, the rack-bar and the front wheel carried thereby, can be fixed at any desired level, and consequently the runners M M can likewise be rotated at the proper level.

Having thus described my invention, what I claim as new, and desire to secure by Letters Patent, is—

1. In a corn-planter, the combination of the main frame, the driving-wheels, the shaft D, the clutch d, and lever g, for operating it, the seed-hoppers, the slides therefor, the center slide connected to the hopper-slides, and the connecting-rod between said center slide and the shaft D, all arranged substantially as described.

2. In a corn-planter, the combination of axle C, having wheels B B, the center slide F, movable in ways F' F' in the main frame, the seed-boxes I I, having perforated bottoms K, the seed-slides J, having openings J', said center slide being connected to the seed-slides by the cross-bars $i\ i$, the connecting-rod E, the shaft D, having a crank $c$, pivoted to the connecting-rod E, and the clutch $d$, whereby the shaft D is connected or disconnected with the driving-wheels, substantially as described.

3. In a corn-planter, the combination of the main frame A, the axle C, having wheels B B, the horizontal shaft D, the clutch $d$ thereon, gears $a$ on wheel B, and the gear on shaft D, meshing with gear $a$, the center slide F, movable in ways F' F' in the main frame, the connecting-rod E, connecting the shaft D with said slide, and the seed-slides J J, connected by cross-bars $i\ i$ with the center slide F, all substantially as described.

In testimony whereof I affix my signature in presence of two witnesses.

JAMES C. HART.

Witnesses:
JOHN H. DEARSTYNE,
JOHN WM. CROSS.